United States Patent [19]
Myers et al.

[11] 3,947,286
[45] Mar. 30, 1976

[54] PIGMENTED ASBESTOS COATING SYSTEMS

[75] Inventors: John L. Myers, Lewiston, N.Y.; Richard W. Lasher, Palos Verdes Peninsula; Russell D. James, La Mirada, both of Calif.

[73] Assignee: Union Carbide Corporation, New York, N.Y.

[22] Filed: July 26, 1974

[21] Appl. No.: 492,062

Related U.S. Application Data

[60] Division of Ser. No. 300,193, Oct. 24, 1972, which is a continuation-in-part of Ser. No. 34,796, May 5, 1970, abandoned.

[52] U.S. Cl............. 106/286; 106/300; 260/29.6 R; 260/17.4 R
[51] Int. Cl.$^2$.... C09K 3/00; C08K 3/34; C08K 7/12
[58] Field of Search......... 106/286, 300; 162/3, 255

[56] References Cited
UNITED STATES PATENTS

| | | | |
|---|---|---|---|
| 3,062,701 | 11/1962 | Novak | 162/155 |
| 3,409,499 | 11/1968 | Dresher | 162/155 |
| 3,547,669 | 12/1970 | Battista | 106/272 |
| 3,652,382 | 3/1972 | Ganey | 162/3 |
| 3,838,085 | 9/1974 | Myers et al. | 260/29.6 R |

Primary Examiner—Theodore Morris
Attorney, Agent, or Firm—Lindenberg, Freilich, Wasserman, Rosen & Fernandez

[57] ABSTRACT

Premium latex paints are disclosed exhibiting superior opacity and brightness characteristics, including dispersed and liberated short chrysotile asbestos fibers having anionic pigment particles electrostatically attached at discrete points along the length of the fibers.

13 Claims, 5 Drawing Figures

PIGMENTED ASBESTOS COATING SYSTEMS

This application is a division of application Ser. No. 300,193, filed Oct. 24, 1972, which in turn is a continuation-in-part of application Ser. No. 34,796, filed May 5, 1970, now abandoned.

The present invention relates to pigment dispersions and coating compositions and, more particularly, to latex paints including a dispersion of pigmented asbestos fibers.

High quality finish and the include hiding pigments such as rutile titanium dioxide ($TiO_2$) which have a high refractive index (2.7) compared to the other ingredients in the system. Opacity, or hide, is a function of the difference in refractive index between the $TiO_2$ and pigment binder, (1.5). The different refractive indices cause the incident light to be bent through a succeeding series of angles within the coating by alternately striking pigment binder, then titanium dioxide. The ultimate result is to reflect the incident light ray.

To optimize this mechanism within a coating system, the titanium dioxide must be thoroughly dispersed. Presently, high speed dissolvers are employed to impart extremely high rates of shear to disperse the titanium dioxide. Surface active agents aid the process by lowering the surface tension of the liquid medium in which the pigments are dispersed, and help keep the pigments separated once the shear is stopped. However, it has not been possible in practice to completely disperse the pigment particles which tend to agglomerate and reduce the optical efficiency of the paint film.

In accordance with the present invention, improved pigment dispersions and paint compositions are prepared by dispersing and firmly holding the pigment particles along the length of liberated, i.e. discrete, highly cationic, colloidal, short fiber, high purity asbestos fibers. When aqueous pigment dispersions containing such pigmented asbestos are incorporated into paints, the resulting film exhibits an increased opacity and has several other unexpected effects.

Even though the asbestos itself is a gray dull material and has a fairly low brightness, unexpectedly the paints incorporating the aqueous pigment dispersions according to the invention have very high brightness levels. It has further been surprisingly discovered that although asbestos usually occurs as lumps which would prevent the dispersability and a fine grind, a very fine finished aqueous latex paint having dispersed solids of a grind or fineness below 2 mils, can readily be manufactured from the aqueous pigment dispersions containing the pigmented asbestos fibrils in accordance with the invention.

The pigmented asbestos of the invention in addition provides improved structural strength to the film and also can decrease or eliminate the necessity for the use of biodegradable thickeneers such as cellulose ethers. Furthermore, since the pigmented asbestos is a less costly product than pure pigment, the cost of manufacture of the paint can be significantly reduced.

U.S. Pat. No. 3,328,238 to Knowles et al discloses stable suspensions of organic or inorganic fibers, including asbestos fibers, in a hydrocarbon vehicle, for use as propellant suspensions, agricultural compositions, oil base drilling fluids, and oil base paints. In the latter application the microfibers act as a suspending matrix for the pigments in the paint, forming a fibre thickened vehicle or gel in which the pigment solids are dispersed. However, this patent bears no relation to and does not suggest the aqueous latex emulsion paint composition of the present invention in which the high purity chrysotile asbestos fibers having certain physical characteristics are predispersed in water to develop a cationic charge so as to electrostatically bond anionic pigments to the asbestos fibers, to form the pigmented asbestos of the invention, as described in detail below.

The above and many other attendant advantages of the invention will become apparent as the invention becomes better understood by reference to the following detailed description when considered in conjunction with the accompanying drawings wherein.

It has been discovered in accordance with the invention that the above advantages are obtainable with particular forms of asbestos having certain surface area, lengths, fiber availability, and very high cationic charge density. The high charge density and liberated form of the fibers allow the fibers to electrostatically bond firmly to anionic pigment which satisfies the charge to form a highly pigmented fibrous product. By the term "liberated" fibers or fibrils is meant that such fibers are in the form of discrete fibers or fibrils, rather than in the form of fibril bundles. Without the electrostatic bonding of the pigments to the fibers to satisfy the cationic charge on the fibers, the available cationic charge on the fibrils reacts with and agglomerates anionic latex particles. Without the cationic fibers, the anionic pigments will tend to agglomerate, reducing optical efficiency. When these materials are combined according to the invention, the pigment is uniformly distributed along the length of the fibers so that the final product resembles and performs like a fibrous pigment. The uniform distribution of the pigmented fibers results in a very high optical efficiency and therefore less hiding pigment is needed to obtain a given opacity.

Pigment dispersions in accordance with the invention incorporate a particular type of high purity chrysotile asbestos. Generally, chrysotile asbestos has a low index of refraction of about 1.51 to 1.55, is the softest and most flexible of the several types of asbestos. When dispersed in water it exhibits a positive or cationic surface charge and a very high tensile strength. Chrysotile asbestos occurs only in serpentine, a fine grained rock composed entirely of hydrous magnesium silicate minerals similar to chrysotile in composition. Most deposits of serpentine contain chrysotile in cross-fiber veins, and the ore typically contains only 6 to 10 percent fiber of random lengths which are tightly bonded together in a parallel configuration.

The unique materials according to the invention bear little resemblance to other serpentine bodies since most of the mass of fibers are highly sheared and pulverized and consist of soft, friable sheets and clumps of asbestos fiber. In contrast to the cross-fiber arrangement of conventional Canadian ores, the high purity chrysotile asbestos material, one form of which is marketed as Calidria asbestos fibers, and is preferred for use in the present invention, is obtained from a deposit near Coalinga, Calif., occurs as a swirling mesh of disoriented fibers.

Figure 1:
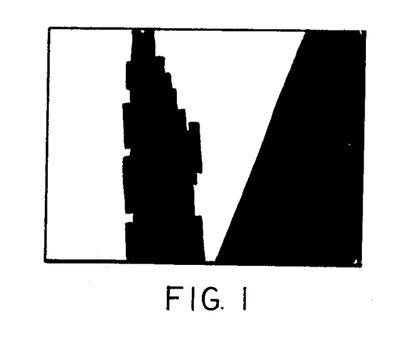
FIG. 1 is an illustration of the appearance of dry processed Calidria fibers, one form of high purity crysotile asbestos fibers, at 20,000 magnification.
Figure 2:
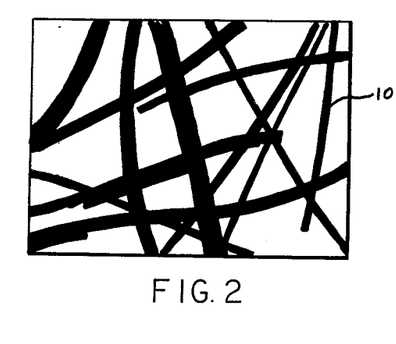
FIG. 2 is an illustration of the appearance of wet processed Calidria fibers.

Conventional asbestos processing methods include blasting, crushing and grinding, and air classifying. Even with the use of the very best dry method of processing high purity chrysotile asbestos ore, fiber bundles are still very much in evidence as shown in FIG. 1. The high purity chrysotile asbestos utilized in the present invention is preferably refined in accordance with a hydraulic beneficiation process to provide substantially separated fibrils 10 as shown in FIG. 2. In the hydraulic beneficiation process, the ore is treated by wet grinding and screening to separate rock from asbestos fiber, flakes and clumps. The asbestos is then subjected to wet mechanical and/or chemical treatment to liberate the fiber, that is, to separate the fibers into discrete fibers, and separate out occluded non-asbestos minerals to form standard grads product. High purity product is obtained by further wet grinding and centrifugal processing of the standard grade product. This process results in separated, individual or discrete fibers of high purity, high liberation and uniform particle size. Thus, this asbestos is different from any other asbestos product available. The physical properties of average Canadian, standard grade Calidria and high purity Calidria asbestos are provided in the following table.

PHYSICAL PROPERTIES OF CHRYSOTILE ASBESTOS-continued

| PROPERTY | AVERAGE CANADIAN | CALIDRIA PRODUCTS | |
|---|---|---|---|
| | | STD. GRADE | HIGH PURITY |
| Surface Area M$^2$/G. | 10–30 | 50–60 | 60–80 |
| Reflectance % | 54–70 | 62–72 | 72–76 |
| Magnetite % | 3–6 | 2.0 | <0.80 |

Specific surface area is calculated from adsorption data using the BET (Brunauer, Emmet, Teller) method as described in Brunauer, "The Adsorption of Gases and Vapors", Princeton University Press (1945).

Magnetite content is measured by a permeametric device patterned after ASTM standard method D-1118-57, which has been improved with respect to sensitivity to measure a limit of detection of 0.005% magnetite.

Reflectance is measured on a sample prepared according to TAPPI (Technical Association of the Pulp and Paper Industry) standard T-452-m-58 and is reported as percent of ultimate reflectance based on magnesium oxide as the standard of 100% reflectance.

The significantly greater purity of the high purity chrysotile asbestos essential in this invention is demonstrated by its improved reflectance of at least 72% and its low magnetite content of less than 0.8% magnetite. The wet processing procedure gives rise to high purity asbestos fibers that are essentially grit-free and of high brightness. The reduced magnetite content of the pure flake product is also a measure of absence of gray appearance that has been characteristic of prior asbestos products. The reduced grayness and absence of black specks is essential in the preparation of premium quality finished paints.

The individual asbestos fibers are in the form of slightly-curved, short tubes having an external diameter of about 260A and an internal diameter of about 110A. The length of the fiber varies from about 100 to 1,000 times the diameter and the average L/D ratio is about 200. Thus, the average fiber length is about 5 micron and it is estimated that there are about $10^{14}$ fibrils in one gram of the high purity chrysotile asbestos.

By virtue of their small diameters and high aspect ratio, the high purity chrysotile asbestos fibrils form colloidal suspensions when suspended in water and behave according to the classical electrokinetic rules of hydrophobic colloids. That is, the fibrils develop a surface charge when suspended in aqueous solution as the result of adsorption of potential determining ions from the suspending medium. The potential determining ions are mainly hydrogen, and therefore, the fibers display a positive charge in the basic ph range. Thus, the term "cationic" asbestos as employed herein is intended to denote asbestos or asbestos fibers which exhibit a cationic charge when dispersed in water under the ph conditions, usually about 4 to about 9.5, generally used in the paint industry. Electrostatic attraction, however, is just one of the factors that influence the effectiveness of the fibers in cofloccing pigment particles. Collision and coagulation rate in suspension are determined by the collision radius which varies as the longest dimension of the particle while diffusion constant varies as the main particle dimension. The net result for the rod-like, high purity chrysotile asbestos particles is a very large effective collision radius and a large diffusion constant. Furthermore, the high surface area of the high purity asbestos fibers, ranging from about 60 to 80 meters$^2$/gram, in combination with the cationic charge provides a very high cationic charge density for attracting and firmly holding the pigment particles.

The high purity chrysotile asbestos can be provided in several forms, particularly useful in forming the pigment dispersion in accordance with the invention. The final form of the fiber in the pigment dispersion is preferably a totally liberated, colloidal form. This is usually achieved with the particular high purity, short fiber chrysotile asbestos of interest which has an ultimate fiber yield of at least 85%, e.g. 85–95%. Canadian chrysotile asbestos fibers, as represented by Canadian 6-D-20 (see Example IX) is only liberated to an extent of about 25–40% ultimate fiber yield under the same conditions.

Ultimate fiber yield is determined by pulping 3 grams asbestos in 250 ml of tap water at high speed in a Waring Blender for 3 minutes. The pulp is washed into a beaker to a final volume of 300 ml. The pulp is dispersed, decanted, flocculated, dried and weighed. Percent ultimate fiber yield is the supernate chrysotile asbestos filter cake weight times 3 divided by the total weight of the two cakes times 100.

The filter cake of liberated asbestos fibers in accordance with this invention is a lightly compacted, essentially non-agglomerated product which is readily redispersible in water with conventional mixers to form an aqueous dispersion containing liberated fibers.

In the first step of making a high quality paint formulation in accordance with the invention, a dispersion of pigments is prepared. The pigment dispersion can contain varying amounts of the pigmented asbestos usually ranging from 1 to 25%, preferably 5 to 10%, of the total solids of the dispersion, depending on the water demand of the various components of the system, the properties desired for the final paint composition and properties desired for the final paint film. The unpigmented high purity chrysotile asbestos fibers have a water demand of about 480% while the pigmented fibers have a lower water demand depending on the quantity and type of pigment.

The demand for pigment in terms of cationic charge is preferably completely or totally satisfied by anionic pigments. The high purity chrysotile asbestos fibers develop a total positive charge which must be completely balanced by combining with a total negative charge which is furnished by the anionic pigment, resulting in electrostatic bonding of anionic pigment along the length of ite fibers. It has been found that in order to completely satisfy the cationic charge on the asbestos fibrils, it is necessary to employ a ratio of at least nine times anionic pigment to asbestos, by weight. Thus, in totally liberated or discrete form, the asbestos fibers or fibrils can cofloc or satisfy about 9 to 10 times the weight thereof with anionic pigment.

The fibers may be totally pigmented with a primary hiding pigment having high efficiency and providing opacity such as rutile titanium dioxide. Anatase titanium dioxide may be used where chalking is desired. Other anionic hiding pigments comprise zinc sulfide, zinc oxide, basic silicate of white lead, lithopane, iron oxide or antimony oxide. Any combination of these hiding pigments may be utilized. In another procedure in accordance with the invention to be discussed below, the fibers may be pigmented with a mixture of anionic hiding pigments or a mixture of anionic hiding and extender pigments. Typical extender pigments and the amounts in percent by weight in which they may be present are provided below. These extender pigments may be combined as desired for a particular end result.

1. Calcium carbonate (whiting) 0 to 25%
2. Hydrated aluminum silicate (clay) 0 to 25%
3. Magnesium silicate (talc) 0 to 8.5%
4. Silicon dioxide and calcium silicate (silicas) 0 to 4.5%
5. Potassium aluminum silicate (micas) 0 to 6.5%
6. Other pigments including barium sulfide, bentonite, magnesium aluminum silicate and various organic and inorganic and crystalline pigments.

The hiding pigment such as titanium dioxide, and the extender pigments such as clay and calcium carbonate, exhibit an anionic or negative charge when dispersed in water as result of attachment of hydroxyl groups to the pigment, and hence are termed "anionic" pigments herein.

Total pigment present in the paint composition of the invention can range from about 4 to about 65% by weight. Anionic hiding pigments are present in an amount generally of about 4 to 25% by weight, or higher. The preferred hiding pigment due to its efficiency in providing opacity is rutile titanium dioxide. Other hiding pigments noted above may be present to replace a part or all of the rutile titanium dioxide.

Figure 3:
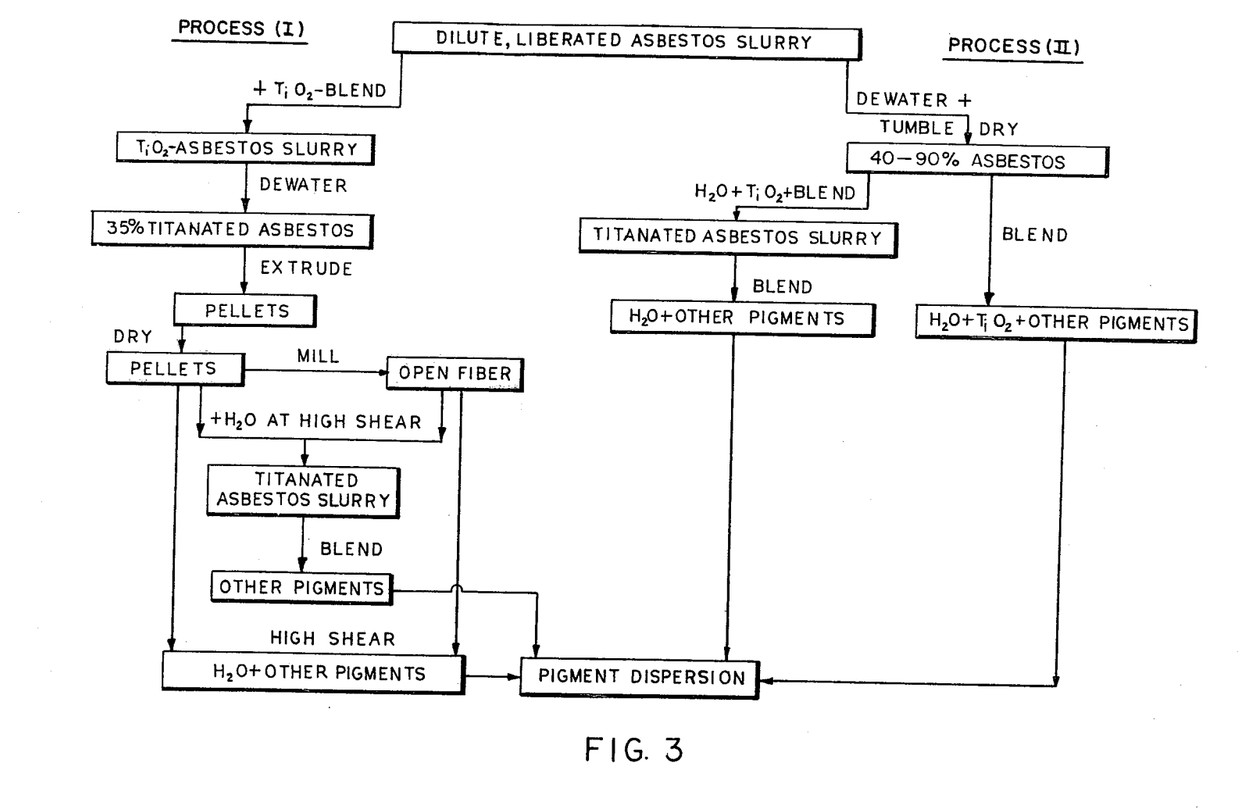
FIG. 3 is a flow chart illustrating alternative processes for forming pigment dispersion.
Figure 4:
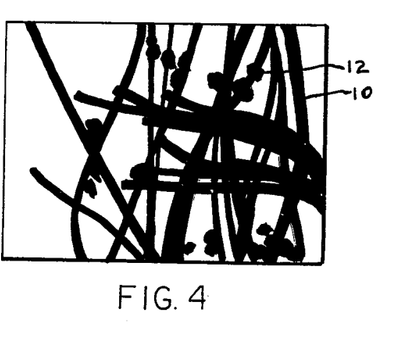
FIG. 4 is an illustration of pigmented liberated fibers of FIG. 2.

Referring now to FIG. 3, several processes for forming pigment dispersion containing coflocced pigmented asbestos are illustrated. In the pellet or open fiber process (I), a dilute liberated asbestos slurry such as a slurry containing 2.5% asbestos is blended with an anionic hiding pigment such as rutile titanium dioxide. Oppositely charged asbestos fibers and titania particles are attracted and bond to each other to form a coflocced product as illustrated in FIG. 4 which shows the fibrils 10 having particles of titania 12 electrostatically attached along the length of the fibers to form a predispersed product. In the pellet, and open fiber process, the ratios of materials are adjusted to form a product containing from 1 to 90% titania, suitably about 35% titania, though the asbestos is capable of holding up to 9 times or more, e.g. 9 to 10 times, its own weight of pigment. The coflocced slurry is dewatered, extruded into pellets and dried in a rotary dryer. The dried pellets can be milled to form an open fiber form of the product.

The paint formulator may predisperse the pellets or open fiber in water with a high shear mixer to form a liberated slurry of the partially titanated asbestos. The remaining pigments are then added, continuing the high shear mixing to form the final pigment dispersion. The separate dispersion in water with high shear mixing better assures complete liberation of the fibers, to form a paint having a fine grind. Alternately, the remaining pigments in water can be added directly to the pellet or open fiber, and mixed with high shear to form the pigment dispersion. The dispersion of the high purity chrysotile asbestos is materially aided by reducing the ph of the slurry to the acid range, preferably from about 4–5. An electrostatic condition in the slurry under these conditions prevents the fibers from reagglomerating.

In the filter cake process, (II), the dilute liberated asbestos slurry is dewatered in a vacuum frame press to form a filter cake containing 40–60% asbestos fiber which may be optionally dried with tumbling in a rotary drier to a homogeneous product having a solids content of 80–90% asbestos. Again, the pigment dispersion can be formed by adding the total pigments at one time to the dispersion of fibers, with blending or separately predispersing the hiding pigment such as rutile titania before adding the remaining pigments and blending to form the pigment dispersion.

Figure 5:
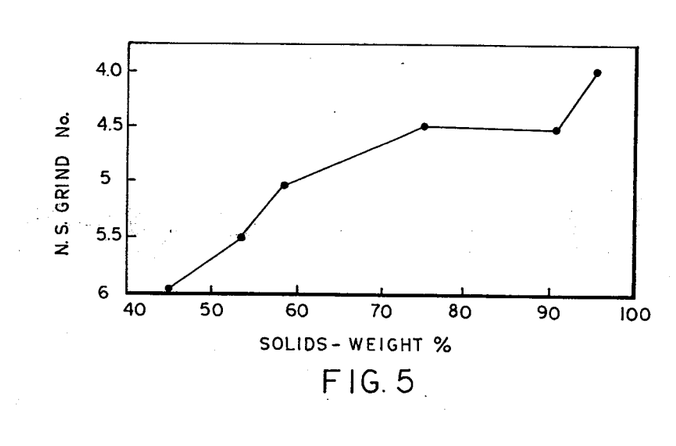
FIG. 5 is a graph illustrating the relationship between the solids content of refined asbestos filter cake and degree of pigment dispersion in terms of National Standard (N.S.) Grind Numbers.

A series of experiments were run to determine the critical percent fiber that could be provided in a reduced water content chrysotile asbestos filter cake that is readily dispersible with conventional mixers available to most paint processors, rather than the high shear and high horsepower mixers necessary to completely disperse the pre-titanated pellets. Standard interior latex paints were prepared according to the formulation of Example 4 with each of these filter cakes. The results are tabulated in the following table and FIG. 5.

TABLE II

| LATEX PAINT CONTAINING FILTER CAKE | |
|---|---|
| Filter Cake | Latex Paint of Example 4 |
| Asbestos Weight % | National Standard Grind No. |
| 41 | 6 |
| 55 | 5.6 |
| 75 | 4.5 |
| 91 | 4.5 |
| 96 | 4 |

Wrinkling was evident at about 91% solids level in the filter cake, and above, indicating incomplete fiber liberation and therefore the presence of available cationic charge which causes coagulation of the anionic latex.

Unexpectedly, the filter cake can be dewatered to a level as high as about 91% by weight of asbestos and still maintain an adequate grind of 4.5, corresponding to less than 2 mils, in the resulting latex paint, indicating fairly good liberation and noncompaction of the fibers into bundles. It is however, preferable to maintain the asbestos content of the filter cake from about 80 to 90% to provide finer finish paint films. The 80 to 90% asbestos filter cake product affords substantial absence of wrinkling as well as adequate grind of less than 2 mils for the latex paint in which such filter cake is incorporated, and is otherwise a very desirable commercial form of asbestos since the water content thereof is sufficiently low to minimize shipping costs and it is a form readily available for dispersion.

The dispersion containing the dispersed pigmented asbestos is incorporated into a latex paint which is defined as a paint in which water is the principal diluent. The nonvolatile portion of the paint is between 30 and 80% while the pigment volume concentration (PVC):

$$\frac{\text{pigment volume}}{\text{pigment volume} + \text{vehicle volume}} \times 100$$

is between about 15 and 80%. The paint may optionally also contain binders, solvents, thickeners, surfactants and various other additives. Exemplary materials for each component with a suggested percentage basis based on the total weight of the paint are provided below. These ingredients are understood to be exemplary and are not intended to any way limit the invention, it being understood that alternate materials can readily be substituted for those suggested.

A general procedure for formulating paint compositions according to the invention is to first charge all liquid ingredients including optional thickeners, and optionally including a portion of the vehicle, especially in the case of modifier vehicles. The charge is thoroughly mixed and the solids namely, the anionic pigment and cationic asbestos fibers, are then added under high shear dispersion. In the case of anionically charged vehicles, such as anionic resins, the presence of the cationically charged asbestos renders it necessary for prepigmentization of the asbestos to completely satisfy this cationic charge, before addition of the anionic vehicle; otherwise, coagulation of the anionic resin will occur as result of the combination of anionic resin with unsatisfied cationic charge on the asbestos. Nonionic vehicles, e.g. nonionic resins, can be added at any stage of the manufacture.

The diluent concentration is preferably maintained between about 20 to 70%. While water is the primary and predominant diluent in a latex paint system, solvents for modifying resin vehicle may also be present. The percentage range also includes the water present in such vehicle portion.

Substantial thickening of the paint is provided by the fairly high water demand of the asbestos. In some cases, secondary thickeners need not be present. However, in most cases, the viscosity of the paint can be adjusted to the desired range of 60 to 125 KU, preferably 80 to 105 KU, by including 0 to about 4% of conventional thickeners such as water soluble cellulose derivatives, e.g. cellulose ethers or esters, for example, hydroxyethyl cellulose, methyl cellulose, and carboxymethyl cellulose. Other types of materials can also function as thickeners such as carboxylated polyacrylic acids, sodium alginate, bentonite clays, a polymethylvinyl ether reaction product with maleic anhydride, and polysaccharides. The expression "K.U." refers to Krebs units, a measure of viscosity which is conventionally used in the paint industry, and is determined with the Krebs-Stormer viscometer, as described in the brochure of the Arthur Thomas, Co., Philadelphia, Pa., "Directions for Use of Stormer Viscosimeter," published 1948.

Surface active agents which function as surfactants and dispersants can be present in the range of about 0.1 to 4% by weight of this composition. These ingredients wet the surfaces of the particles and stabilize the emulsion or colloidal system. Usually only anionic and non-ionic compounds are utilized in latex paints and preferably a mixture of these types of surfactants is utilized. Many diverse types of surfactants which are commonly used in the formulation of latex paints are suitable for use in forming the pigmented asbestos latex paints in accordance with the invention.

Exemplary anionic surfactants are saponified fats, sulfonated materials such as fatty acid esters, monovalent alcohol esters of fatty acids, fatty acid amides, fatty acid nitriles, fatty aldehydes, secondary alcohols, or aromatic hydrocarbons. Other suitable anionic surfactants are alkali sulfonates of alcohols having 6 or more carbon atoms, aminopolycarboxylic acids and the condensation products of fatty acid chlorides and amines.

There are fewer non-ionic compounds commercially available. Exemplary non-ionic surfactants are saponines and their derivatives, the condensation products of ethylene oxide with fatty acids and their derivatives or with phenolic compounds having a side chain.

Coalescing agents can be provided in an amount of 0 to 4.5% as needed. Coalescing agents aid in film formation during the drying cycle. They are solvents for the vehicle and eventually evaporate from the paint film. Typical coalescing agents include plasticizers such as dibutyl phthalate, glycols like hexylene glycol, glycolethers, and certain alcohols.

Freeze-thaw stability is an important property for paints stored in cold climates. Glycols such as ethylene glycol, diethylene glycol and propylene glycol are added in an amount of 0 to 4.5% to insure freeze-thaw stability.

Latex emulsions, e.g. an anionic, nonionic or cationic latex, and various modifiers therefore, can be provided in an amount providing about 5 to 50%, preferably about 5 to 25%, by weight of resin solids in the paint composition. Latex emulsions can be comprised of many polymer types, and commercially available emulsions contain 30 to 70% by weight resin solids in the form of nonvolatile polymer. The polymer generally employed according to the invention contains an ethylenically unsaturated polymerizable vinyl group. The polymer functions to bind the pigment particles together and to bind the paint film to the substrate. Generic types of suitable latex emulsions and polymers are listed below:

1. Polyvinyl acetate homopolymer latexes.
2. Vinyl Acetate — acrylic copolymer latexes. The acrylic portion includes but is not limited to ethyl acrylate, isobutyl acrylate, methyl methacrylate, N-butyl acrylate, methacrylic acid, N-methylol acrylamide, acrylonitrile, 2-ethylhexyl acrylate, and acrylic acid. Furthermore, these copolymers may contain itaconic acid, styrene, butadiene, ethylene, vinyl chloride, maleates, and fumarates. Specific examples of such polymers are the copolymer of vinyl acetate and butyl acrylate, vinyl acetate and 2-ethylhexyl acrylate, vinyl acetate and dibutyl maleate.
3. Acrylate Latexes — The acrylate latexes may contain any combination of acrylate and acrylic monomers noted above in vinyl acetate-acrylic latexes, except for vinyl acetate. Specific examples of such polymers are the copolymer of ethyl acrylate, methyl methacrylate and methacrylic acid, and the copolymer of butyl acrylate, methyl methacrylate and acrylic acid.
4. Other latexes include polymers of styrene-butadiene, styrene-acrylic, acrylonitrile-butadiene rubber, butadiene rubber, and ethylene-vinyl acetate, vinylidene-chloride, and acrylate-vinyl chloride polymers.

It will be understood that the proportions of comonomers in the above described copolymers can be varied as desired and as well understood in the art, to obtain the desired properties. Thus, for example in the copolymer of vinyl acetate and butyl acrylate the monomer proportions can range from 90 to 75% vinyl acetate monomer and 10 to 25% butyl acrylate monomer; and in the copolymer of ethyl acrylate, methyl methacrylate and methacrylic acid, the proportions of monomers can range from 40 to 70% ethyl acrylate, 20 to 35% methyl methacrylate and 0.5 to 3% methacrylic acid.

Latexes containing combinations of the above resins can also be employed, such as a combination of vinyl acetate homopolymer and copolymer of vinyl acetate and butyl acrylate.

The resins in the above latexes in the presence of anionic surfactants generally achieve an anionic charge. This is due to the polymerzation of the monomers to form the resins, in the presence of such surfactants carrying an anionic charge. Polymerzation can also be achieved in the presence of nonionic and cationic surfactants, in which case the resulting resins are either nonionic or cationic in nature. However, because of the cationic charge of the chrysotile asbestos fibers, the anionic latexes generally employed to the major extent in latex paints, must be added to the dispersion of the chrysotile asbestos fibers after addition thereto of the anionic pigment in order to completely satisfy the cationic charge of the fibers with the anionic charge of the pigment, prior to addition of the anionic latex, to avoid coagulation, as noted above.

Any of the above latexes may be modified with organic solvent based binders or oils which may be of the drying or non-drying type. These modifiers in turn may be emulsified. Modifiers may comprise from 0 to 70% of the vehicle solids in a given paint in which water is the principle diluent. Suitable modifiers are the oils such as linseed oil, tung oil, safflower oil, tall oil rosins or tall oil esters. Resin modifiers comprise alkyd resins, epoxy resins, vinyl resins, acrylic resins, silicone resins, phenolic resins, ester gums and cellulose resins.

Various miscellaneous ingredients may be present in an amount of 0 to 4% by weight. Included in this category are defoamers which may or may not contain silicones and fungicides, of the mercuric and non-mercuric types. Driers for the solvent based modifier such as cobalt, zinc or magnesium naphthenates or phthalates may also be provided when needed. Other various materials may be incorporated for special purposes as are well known in the art.

Generally the paint composition of the invention includes, in addition to the dispersion of the pigmented asbestos and latex, additional optional components, particularly thickener, surfactant, e.g. anionic surfactant, and coalescing agent.

A series of paint formulations were prepared by first charging in order, water, thickener, surfactant, fungicide, freeze-thaw additive, coalescing agent, and about one-half of the defoamer, and mixing for 5 minutes at low speed. Thereafter, the $TiO_2$ was added and dispersed until a desired dispersion was achieved. Mixing speed was increased. The remaining pigments, including calcium carbonate, clay and the high purity chrysotile asbestos fibers, were then added and mixed at high speed to form a pigment-asbestos fiber dispersion. The latex and remainder of the defoamer were then added to the pigment-asbestos fiber dispersion at low speed. Agitation should be continuous and each ingredient dispersed before the next is added.

The chemical identification of each ingredient by type, formula and function is provided wherever possible. The asbestos utilized in each case, except for Example 9, was high purity, short fiber chrysotile asbestos in the form of Calidria asbestos as either dispersed unpigmented filter cake or in pretitanated pellet form, as indicated. The ingredients utilized in the formulations are provided in the following table, and the examples follow thereafter.

TABLE III

| FUNCTION | MATERIAL | GENERIC TYPE |
|---|---|---|
| Solvent | Water | $H_2O$ |
| Thickener | Bentone LT | Organically modified bentonite |
| Anionic Surfactant | TAMOL 731 | Sodium salt of diisobutylene maleic anhydride |
| Do. | VICTAWET 35B | Sodium octyl phosphate |
| Nonionic Surfactant | ADVAWET 33 | Polyglycol ester |
| Freeze-Thaw | Ethylene Glycol | |
| Coalescent | Butyl Carbitol Acetate | Monoether of diethylene glycol |
| Defoamer | NOPCO NXZ | 0.1% Si |
| Fungicide | CMP Acetate | Chloromethoxy-Acetoxy mercuripropane |
| Hiding Pigment | Ti Pure R-960 | $TiO_2$ |
| Extender Pigment | ASP 170 Clay | Kaolin Clay |
| Do. | VICRON 25-11 | Calcium Carbonate |
| Do-Asbestos | CG 100 | High Purity Chrysotile |
| Do-Titanated Asbestos | CG 135 | Do + 35% $TiO_2$ |
| Do-Filter Cake | CG 100 | 40 to 50% solids |
| Do-Titanated Filter Cake | CG 135 | 40 to 55% solids |
| Solvent | Water | $H_2O$ |

TABLE III-continued

| FUNCTION | MATERIAL | GENERIC TYPE |
|---|---|---|
| Defoamers | NOPCO NXZ | |
| Latex Emulsion | NAT-1 (55%) | Copolymer of Vinyl Acetate and Butyl Acrylate (anionic) |
| Do. | UCAR-130 (58%) | Vinyl Acetate homopolymer (nonionic) |
| Do. | UCAR 370 (46%) | Acrylic Emulsion containing copolymer of ethyl acrylate methyl methacrylate, and methactylic acid (anionic) |
| 0.1 Modifier | PVO-44 (65%) | Bodied Safflower emulsion |
| Epoxy Modified | Polytex 611 Q | Epoxy ester emulsion |
| Thickener | Cellosize QP-4400 | A hydroxy ethyl cellulose |

EXAMPLE 1

| MATERIAL | POUNDS |
|---|---|
| Water | 225 |
| Bentone LT | 5.5 |
| TAMOL 731 — 25% Active | 3 |
| VICTAWET 35B | 5.7 |
| ADVAWET 33 | 4 |
| Ethylene Glycol | 15 |
| Butyl Carbitol Acetate | 15 |
| NOPCO NXZ | 2 |
| CMP Acetate | 0.5 |
| Ti Pure R-960 | 242.5 |
| ASP 170 Clay | 100 |
| VICRON 25-11 | 144.7 |
| Water | 151 |
| NOPCO NXZ | 2 |
| NAT-1 (55%) | 287 |
| TOTAL - | 1202.9 |

EXAMPLE II

| MATERIAL | POUNDS |
|---|---|
| Water | 306 |
| Bentone LT | 4.3 |
| TAMOL 731 — 25% Active | 3 |
| VICTAWET 35B | 5.7 |
| ADVAWET 33 | 4 |
| Ethylene Glycol | 15 |
| Butyl Carbitol Acetate | 15 |
| NOPCO NXZ | 2 |
| CMP Acetate | 0.5 |
| Ti Pure R-960 | 225 |
| ASP 170 Clay | 100 |
| VICRON 25-11 | 112 |
| CG 135 | 50 |
| Water | 131.5 |
| NOPCO NXZ | 2 |
| NAT-1 (55%) | 287 |
| TOTAL - | 1263 |

EXAMPLE III

| MATERIAL | POUNDS |
|---|---|
| Water | 306 |
| Bentone LT | 4.3 |
| TAMOL 731 — 25% Active | 3 |
| VICTAWET 35B | 5.7 |
| ADVAWET 33 | 4 |
| Ethylene Glycol | 15 |
| Butyl Carbitol Acetate | 15 |
| NOPCO NXZ | 2 |
| CMP Acetate | 0.5 |
| Ti Pure R-960 | 225 |
| ASP 170 Clay | 100 |
| VICRON 25-11 | 112 |
| CG 135 | 98. (51%) |
| Water | 83.5 |
| NOPCO NXZ | 2 |
| NAT-1 (55%) | 287 |
| TOTAL - | 1263 |

EXAMPLE IV

| MATERIAL | POUNDS |
|---|---|
| Water | 315 |
| Bentone LT | 4.3 |
| TAMOL 731 — 25% Active | 3 |
| VICTAWET 35B | 5.7 |
| ADVAWET 33 | 4 |
| Ethylene Glycol | 15 |
| Butyl Carbitol Acetate | 15 |
| NOPCO NXZ | 2 |
| CMP Acetate | 0.5 |
| Ti Pure R-960 | 242.5 |
| ASP 170 Clay | 100 |
| VICRON 25-11 | 112 |
| CG 100 | 70. (46.5%) |
| Water | 85 |
| NOPCO NXZ | 2 |
| NAT-1 (55%) | 287 |
| TOTAL - | 1263 |

EXAMPLE IVA

| MATERIAL | POUNDS |
|---|---|
| Water | 243 |
| TAMOL 731-25% Active | 3 |
| VICTAWET 35B | 6.9 |
| ADVAWET 33 | 4.8 |
| Ethylene Glycol | 15 |
| Butyl Carbitol Acetate | 15 |
| NOPCO NXZ | 2 |
| CMP Acetate | 0.5 |
| Ti Pure R-960 | 242.5 |
| ASP 170 Clay | 100 |
| VICRON 25-11 | 93.7 |
| CG 100 | 107.4 (46.5%) |
| Water | 40 |
| NOPCO NXZ | 2 |
| NAT-1 (55%) | 285 |
| TOTAL - | 1160.8 |

EXAMPLE V

| MATERIAL | POUNDS |
|---|---|
| Water | 315 |
| Bentone LT | 4.3 |
| TAMOL 731-25% Active | 3 |
| VICTAWET 35B | 5.7 |
| ADVAWET 33 | 4 |
| Ethylene Glycol | 15 |
| Butyl Carbitol Acetate | 15 |
| NOPCO NXZ | 2 |
| CMP Acetate | 0.5 |
| Ti Pure R-960 | 242.5 |
| ASP 170 Clay | 100 |
| VICRON 25-11 | 112 |
| CG 100 | 70. (46.5%) |
| Water | 95 |
| NOPCO NXZ | 2 |
| NAT-1 (55%) | 216. (55%) |
| PVO-44 (65%) | 61. (65%) |
| TOTAL - | 1263 |

EXAMPLE VI

| MATERIAL | POUNDS |
| --- | --- |
| Water | 315 |
| Bentone LT | 4.3 |
| TAMOL 731-25% Active | 3 |
| VICTAWET 35B | 5.7 |
| ADVAWET 33 | 4 |
| Ethylene Glycol | 15 |
| Butyl Carbitol Acetate | 15 |
| NOPCO NXZ | 2 |
| CMP Acetate | 0.5 |
| Ti Pure R-960 | 242.5 |
| ASP 170 Clay | 100 |
| VICRON 25-11 | 112 |
| CG 100 | 70. (46.5%) |
| Water | 90 |
| NOPCO NXZ | 2 |
| NAT-1 (55%) | 216. (55%) |
| Polytex 611 Q | 66. (60%) |
| TOTAL - | 1263 |

EXAMPLE VII

| MATERIAL | POUNDS |
| --- | --- |
| Water | 315 |
| Bentone LT | 4.3 |
| TAMOL 731-25% Active | 3 |
| VICTAWET 35B | 5.7 |
| ADVAWET 33 | 4 |
| Ethylene Glycol | 15 |
| Butyl Carbitol Acetate | 15 |
| NOPCO NXZ | 2 |
| CMP Acetate | 0.5 |
| Ti Pure R-960 | 242.5 |
| ASP 170 Clay | 100 |
| VICRON 25-11 | 112 |
| CG 100 | 70. (46.5%) |
| Water | 100 |
| NOPCO NXZ | 2 |
| UCAR-130 (58%) | 272. (58%) |
| TOTAL - | 1263 |

EXAMPLE VIII

| MATERIAL | POUNDS |
| --- | --- |
| Water | 315 |
| Bentone LT | 4.3 |
| TAMOL 731-25% Active | 3 |
| VICTAWET 35B | 5.7 |
| ADVAWET 33 | 4 |
| Ethylene Glycol | 15 |
| Butyl Carbitol Acetate | 15 |
| NOPCO NXZ | 2 |
| CMP Acetate | 0.5 |
| Ti Pure R-960 | 242.5 |
| ASP 170 Clay | 100 |
| VICRON 25-11 | 112 |
| CG 100 | 70. (46.5%) |
| Water | 29 |
| NOPCO NXZ | 2 |
| Ammonium Hydroxide | 2 |
| UCAR 370 (46%) | 343. (46%) |
| TOTAL - | 1265 |

EXAMPLE IX

| MATERIAL | POUNDS |
| --- | --- |
| Water | 225.0 |
| Bentone LT | 4.3 |
| TAMOL 731-25% Active | 3.0 |
| VICTAWET 35B | 12.7 |
| ADVAWET 33 | 9.0 |
| Ethylene Glycol | 15.0 |
| Butyl Carbitol Acetate | 15.0 |
| NOPCO NXZ | 2.0 |
| CMP Acetate | 0.5 |
| Ti Pure R-960 | 242.5 |
| ASP 170 | 100.0 |
| VICRON 25-11 | 112.2 |
| Canadian Asbestos 6-D-20 | 32.5 |

EXAMPLE IX-continued

| MATERIAL | POUNDS |
| --- | --- |
| (Canadian No. 6 shorts) | |
| Water | 326.0 |
| NOPCO NXZ | 9.0 |
| NAT-1 | 285.0 |
| TOTAL - | 1393.7 |

The properties and characteristics of the latex paints and dried films are listed in the following table.

TABLE

| EXAMPLE | I | II | III | IV | IVA |
| --- | --- | --- | --- | --- | --- |
| Viscosity (KU) | 110 | 102-3 | 96-7 | 97-8 | 66 |
| Reflectance | 91 | 91 | 91 | 91 | 88 |
| PVC (%) | 53.04 | 53.04 | 53.04 | 53.04 | 52.45 |
| Contrast Ratio | 0.967 | .973 | 0.978 | 0.978 | 0.983 |
| Solids (%) | 54.87 | 52.45 | 52.45 | 52.45 | 56.5 |
| Yield (Gallons) | 100 | 108 | 108 | 108 | 96 |
| N.S. Grind No. | 7 | 4-5 | 6 | 5-6 | 5-6 |

| EXAMPLE | V | VI | VII | VIII | IX |
| --- | --- | --- | --- | --- | --- |
| Viscosity (KU) | 103 | 107 | 112 | 82 | 150 |
| Reflectance | 90 | 90 | 91 | 90 | 88 |
| PVC (%) | 53.04 | 53.04 | 53.04 | 53.04 | 53.04 |
| Contrast Ratio | 0.967 | 0.967 | 0.989 | 0.978 | 0.994 |
| Solids (%) | 52.45 | 52.45 | 52.45 | 52.45 | 48.23 |
| Yield (Gallons) | 108 | 108 | 108 | 108 | 123.6 |
| N.S. Grind No. | 5-6 | 5-6 | 5-6 | 5-6 | 0 |

DISCUSSION

Example 1 is a typical interior latex paint formulation (53.0% PVC, 54.9% Solids) which provides a standard measure of reflectance (91) and opacity (contrast ratio 0.967) for a 242.5 pound level of rutile titanium dioxide. The pigments in this system require 150 pounds of water to be properly dispersed leaving 226 pounds of free water. Since the asbestos has a water sorption of about 480%, the quantity that can be added is a function of the difference in water demand between the asbestos and the pigment it is replacing as well as the free water available. The lowered amount of free water lowers the amount of thickener required and this improves the flow and leveling rheology of the paint. Usually around 1-25%, preferably 7-20%, of total pigments can be replaced with the high purity type chrysotile asbestos (HPTCA).

The water demand of the asbestos and therefore the level at which it could be incorporated into latex paints could be modified by treating the product with agents, which induces hydrophobicity, such as fatty acids and their derivatives, silicones, silanes and various other materials.

A dry titanated asbestos (35% $TiO_2$) in pellet form was predispersed and then incorporated into the formulation of Example 2 at a 50 pound level, replacing 32.5 pounds of calcium carbonate and 17.5 pounds of the original charge of $TiO_2$ which is now contained on the titanated fibers. The reflectance remains at 91 and the contrast ratio was 0.973.

The asbestos has in effect predispersed the $TiO_2$ electrostatically along the fibers, thereby increasing its opacity when incorporated into a coating. The high brightness is quite unexpected. Asbestos has a 72% G.E. brightness and with replacement of a portion of a high brightness pigment this lower brightness material would be expected to substantially lower the reflectance of the resulting paints. The maintenance of high brightness is further indication that the asbestos fibers are electrostatically coated with the high brightness anionic pigments which hide the grayness of the fibers.

There were several indications that the fibers were not completely liberated. The grind reading decreased from 7 to 4–5 indicating the presence of some fiber bundles. The film was slightly grayer indicating some of the fibers are not completely pigmented and the surface wrinkled slightly indicating that cationic charge was available to coagulate the latex. Both of these latter effects could be due to compaction which prevents pigment deposition to satisfy the cationic surface charge of the fibers.

Example 3 is identical to Example 2, except titanated filter cake (51% solids) was substituted for the predispersed pellet and the water adjusted for the filter cake water component. The film had a reflectance of 91 and a contrast ratio of 0.978. The grind reading improved to 6 and no wrinkling was evident. Thus, the filter cake product is in a more available form, can be dispersed with conventional equipment and provides a finer grind surface.

In Example 4, the filter cake (untitanated 46.5% solids), and the titanium dioxide are added separately to the pigment dispersion. The reflectance is again 91 and the contrast ratio is 0.978. This demonstrates that the asbestos fibers are in fact coflocculating with the anionic pigments during paint manufacture.

The fibers are coflocculating with more than the titanium dioxide and the extender pigments are filling in the available spaces on the fibers. The pigment demand of the totally liberated fibers is about 900 to 1000% by weight. In Example 4A, the amount of filter cake was increased to 50 pounds. The resultant paint gave a grayish appearance when compared to the paint of Example 4. Only 342 pounds of the preferred anionic pigments are available (680%). Consequently, a portion of the asbestos fiber remained uncoated giving a discolored film.

The reflectance decreased to 88 as compared to 91 for Example 4. The contrast ratio was 0.983. Contrast ratio is defined as reflectance over a black substrate divided by the reflectance over a white substrate. The reflectance readings stated in this application are tested over a white substrate. Therefore, paints with a lower reflectance will be grayer and have a higher contrast ratio although the opacity may actually decrease as is the case in Example 4A.

The pigmented asbestos is compatible with diverse types of latex systems as well as oil and epoxy modified emulsions as shown in Examples 5 to 8. In each case, stable paints were prepared having acceptable application and working properties.

Example 9 is an attempt to prepare a similar latex paint utilizing Canadian Grade No. 6-D-20 shorts asbestos. It failed in every possible desired criteria. The Canadian asbestos could not be dispersed and gave a grind reading of 0 which is equivalent to a grind of no less than 4 mils, whereas the paints of the invention have grinds between 0.5 and 2.0 mils, equivalent to a grind Number of 4 to 7, and preferably less than 2 mils.

The Canadian asbestos could not be liberated or pigmented since the film was very gray and the surface wrinkled indicating remaining available cationic charge. The high viscosity is also indicative of available cationic charge. The water content was substantially increased and the solids dropped to 48.3%, yet the viscosity was still 150 K.U. A premium quality finish paint must have a viscosity between about 70 to 125 preferably 80 to 115 K.U. The random length Canadian No. 6-D-20 asbestos fibers are incapable of complete liberation and do not cofloc with anionic pigments to form totally pigmented products in which the cationic charge of the fibers is satisfied.

The following are additional examples illustrating the invention.

| Ingredients | EXAMPLE X 9 Parts TiO$_2$ 1 Part Asbestos | EXAMPLE XI 8.5 Parts TiO$_2$ 1 Part Asbestos | EXAMPLE XII 10 Parts TiO$_2$ 1 Part Asbestos |
|---|---|---|---|
| Water | 630 | 630 | 630 |
| CELLOSIZE QP-4400 | 0.5 | 0.5 | 0.5 |
| Tamol 731 | 6.0 | 6.0 | 6.0 |
| Victawet 35-B | 11.4 | 11.4 | 11.4 |
| Advawet 33 | 8.0 | 8.0 | 8.0 |
| Nopco NXZ | 4.0 | 4.0 | 4.0 |
| Ti Pure R-960 | 576.0 | 576.0 | 576.0 |
| Asbestos CG 100 Filter Cake (44% solids) | 145.5 | 154.0 | 131.0 |
| Ethylene Glycol | 30.0 | 30.0 | 30.0 |
| Butyl Carbitol Acetate | 30.0 | 30.0 | 30.0 |
| UCAR-130 | 463.3 | 465.8 | 460.7 |
| Physical Properties | | | |
| Viscosity (KU) | 65 | 78 | 74 |
| Reflectance | 93 | 92.5 | 93 |
| P.V.C. (%) | 43.04 | 43.16 | 42.74 |
| Contrast Ratio | 0.9785 | 0.9730 | 0.9785 |
| Total Solids (%) | 49.06 | 48.94 | 49.20 |
| Yield (Gallons) | 161 | 162 | 160 |
| N.S. Grind No. | 6 | 6 | 6 |

Referring to Examples X, XI and XII the viscosity of 65–78 for all of these compositions is within the usable range. As to reflectance, however, it is noted that Examples X and XII with ratios of pigment to asbestos of 9 to 1 and 10 to 1 respectively have the same high reflectance values of 93, whereas Example XI, with a ratio of 8.5 pigment to 1 part asbestos, and below the 9 to 1 lower limit of the invention paint composition, has a lower reflectance of 92.5, and hence a lower brightness as compared to the paints of Examples X and XII.

Also, it is noted that Examples X and XII have a contrast ratio of 0.9785 whereas Example XI, having a pigment to asbestos ratio of 8.5 to 1, has a reduced contrast ratio of 0.9730, indicating that opacity and hiding power at a pigment to asbestos ratio of 9 to 1 or greater, are at a maximum for a given quantity of hiding pigment to asbestos, and such contrast ratio remains at such maximum with increase in the ratio of pigment to asbestos above 9 to 1, whereas such opacity and hiding power undesirably decreases at a ratio of pigment to asbestos below 9 to 1.

In summary, the particular high purity chrysotile asbestos in accordance with the invention can be completely liberated and can in this form completely cofloc with at least 9 times its weight of anionic pigment, usually 900 to 1000% by weight of anionic pigments. The pigments are dispersed along the length of the asbestos fibers and hide the relative grayness of the fibers, increasing opacity. The opacity difference is quite dramatically displayed when 1.5 mil films are observed on a hide chart.

The physical nature of the colloidal fibers with an average L/D ratio of 200 provides reinforcement by the whisker effect and improves the structural integrity of the paint film. The film has a high tensile strength and can experience large changes in substrate dimensions before the film cracks or fails. The durability, scrubbability and service life of the film are considerably enhanced.

Another desirable result is the degree of pigment dispersion attainable when the asbestos in filter cake form is incorporated into latex paints. The prior available dry Canadian fibers were limited to a maximum dispersion or grind of 3.5 mils while the filter cake yields a dispersion or grind of 1.2 mils. This is the first material which allows the use of asbestos in premium interior and exterior paints.

It is to be understood that only preferred illustrative embodiments of the invention have been disclosed and that numerous substitutions, alterations and modifications can readily be practiced by those skilled in the art without departing from the spirit and scope of the invention as defined in the following claims.

We claim:

1. A pigment dispersion for a coating composition in which the pigment solids consist essentially of anionic pigmented, liberated, colloidal, high purity chrysotile asbestos fibers having a surface area of about 60–80 meters$^2$/gram, a reflectance of at least 72% and a magnetite content of below 0.8%, an amount of anionic pigment being present sufficient to completely satisfy the cationic charge on said asbestos fibers.

2. A pigment dispersion according to claim 1 in which the pigment solids are dispersed in water, the pigments being anionic pigments and the chrysotile asbestos fibers being cationic liberated asbestos fibers, the ratio of pigments to asbestos is at least 9:1 and in which the grind of the dispersion is no more than 2.0 mils.

3. A pigment dispersion according to claim 2 in which said anionic pigments comprise a mixture of hiding and extender pigments.

4. A pigment dispersion according to claim 3 in which the hiding pigment comprises rutile titanium dioxide.

5. A pigment dispersion according to claim 4 in which the extender pigments are selected from the group consisting of calcium carbonate, silica, clay, talc, mica and mixtures thereof.

6. A method of preparing a pigment dispersion comprising the steps of:
    dispersing in water a predetermined quantity of short fiber, high purity, chrysotile asbestos having a surface area of about 60–80 meters$^2$/gram, a reflectance of at least 72%, and a magnetite content of below 0.8%, by weight to form a colloidal slurry of cationically charged, liberated fibers;
    adding anionic pigments to said slurry to electrostatically cofloc said pigments along the length of said fibers, the ratio of pigment to asbestos being at least 9:1 by weight; and
    blending said pigmented asbestos fibers to form a uniform dispersion thereof.

7. A method according to claim 6 in which said pigments comprise a mixture of hiding and extender pigments.

8. A method according to claim 7 in which at least a portion of said hiding pigment is first combined with said fiber slurry.

9. A high efficiency hiding pigment for coating compositions comprising:
    high purity, uniform, short length chrysotile asbestos fibers having a surface area of from about 60–80 meters$^2$/gram, a reflectance of at least 72%, a magnetite content below 0.8% by weight and an average L/D ratio of about 200; and
    said fibers being electrostatically combined with rutile titanium dioxide pigment particles to form a titanated asbestos product redispersible in water to form liberated, separated, pigmented asbestos fibers, containing a ratio of at least 9 times said pigment to asbestos.

10. A pigment according to claim 9 in which said titanated fibers are in the form of a pellet having a water content below about 2% by weight.

11. A pigment according to claim 9 in which said fibers are in the form of milled, dry, titanated fibers having a water content below 2% by weight.

12. A pigment dispersion accroding to claim 2, said high purity asbestos fibers having a surface area ranging from about 60–80 meters$^2$/gram.

13. A method according to claim 6, in which said dispersion has a grind of less than 2 mils and wherein the asbestos added to the slurry is in the form of a lightly compacted redispersible product containing less than 60% by weight of water.

* * * * *